United States Patent [19]
Kaiser

[11] Patent Number: 4,711,237
[45] Date of Patent: Dec. 8, 1987

[54] PROTECTIVE SANITARY BARRIER FOR CPR DOLL

[76] Inventor: June Kaiser, 333 E. Ontario 813 B, Chicago, Ill. 60611

[21] Appl. No.: 821,462

[22] Filed: Jan. 22, 1986

[51] Int. Cl.⁴ .................................... A61M 16/00
[52] U.S. Cl. ........................... 128/136; 128/202.28; 128/206.25; 428/41; 428/137
[58] Field of Search ............. 128/136, 202.28, 203.29, 128/206.25; 132/88.5; 434/99, 100, 265, 377; 428/41, 137

[56] References Cited

U.S. PATENT DOCUMENTS

| | | | |
|---|---|---|---|
| 2,276,612 | 3/1942 | Ellis | 128/136 |
| 2,695,622 | 11/1954 | Herod et al. | 132/88.5 |
| 3,695,265 | 10/1972 | Brevik | 132/88.5 X |
| 4,050,457 | 9/1977 | Davidson | 128/202.28 |
| 4,183,431 | 1/1980 | Schmidt et al. | 206/382 X |
| 4,190,916 | 3/1980 | McMullan | 5/451 |
| 4,406,281 | 9/1983 | Hubbard et al. | 128/132 R |
| 4,467,799 | 8/1984 | Steinberg | 128/206.25 X |
| 4,510,931 | 4/1985 | Henderson et al. | 128/202.28 |

Primary Examiner—Henry F. Epstein
Attorney, Agent, or Firm—John Cyril Malloy

[57] ABSTRACT

The protective barrier is a sheet of material with an adhesive on one surface. The sheet has an area which corresponds to the region between the left and right zygomatic portions of the CPR doll and from the maxilla to the mid-chin portion of the CPR doll. The sheet has a central opening which is elliptical in shape. The opening is positioned in the sheet such that it corresponds to the oral opening of the CPR doll. The pediatric CPR protective barrier is generally pear-shaped and extends over the nasal bridge and nostrils of the pediatric CPR doll. This barrier includes two apertures adapted to be positioned proximate the nasal openings of the pediatric CPR doll.

7 Claims, 3 Drawing Figures

PROTECTIVE SANITARY BARRIER FOR CPR DOLL

BACKGROUND OF THE INVENTION

This invention relates generally to a protective barrier adapted to be placed onto the mouth and lips of an "Annie Doll" commonly used for teaching individuals cardiopulmonary resuscitation (herein CPR). The "Annie Doll" is referred to herein as "CPR doll" and is manufactured by Laerdal Medical Corporation and is available through Armstrong Industries in Northbrook, Ill.

The instruction of individuals in CPR normally entails the use of a CPR doll. Resuscitation of an individual is necessary if the individual stops breathing. The person conducting the cardiopulmonary resuscitation generally determines whether the individual in distress is unconscious, deterines whether such individual is breathing, and determines whether such individual has a heartbeat. The CPR doll simulates an individual in cardiac and respiratory arrest who is not breathing and who does not have a pulse. The individual learning CPR eventually places his/her mouth over the CPR doll's mouth, breathes into the oral cavity of the doll and forces air into the lungs of the doll. A pediatric CPR doll is also available which simulates cardiac and respiratory arrest in an infant and small child. The person learning CPR places his mouth over the mouth and nasal passages of the pediatric CPR doll to inflate the doll's lungs. Customarily, CPR training is given to a group of individuals and several individuals work with a single CPR doll. In order to reduce the possibility of spreading germs among the group using a single CPR doll, there exists a need for minimizing the oral contact between the person learning CPR and the CPR doll.

OBJECTS OF THE INVENTION

It is an object of this invention to provide a protective barrier between the CPR doll and the person learning CPR.

It is another object of the present invention to provide a barrier which releasably adheres to the lip region of the adult CPR doll such that, after each individual learning CPR finishes with the CPR doll, the protective barrier is removed and a new barrier is adhered to the CPR doll for the next individual.

It is a further object to minimize the spread of contaminants from one student of CPR to another in which the CPR doll may act as a host or reservoir for infectious diseases.

SUMMARY OF THE INVENTION

The protective barrier is a sheet of material with an adhesive on one surface. The sheet has an area which corresponds to the region between the left and right zygomatic portions of the CPR doll and from the maxilla to the mid-chin portion of the CPR doll. The sheet has a central opening which is elliptical in shape. The opening is positioned in the sheet such that it corresponds to the oral opening of the CPR doll. A paper backing is affixed to the adhesive carrying surface of the sheet which is removed prior to adhering the protective barrier sheet onto the lip region of the CPR doll. The pediatric CPR protective barrier is generally pear-shaped and extends over the nasal bridge and nostrils of the pediatric CPR doll. This barrier includes two apertures adapted to be positioned proximate the nasal openings of the pediatric CPR doll, and the opening at the doll's mouth.

BRIEF DESCRIPTION OF THE DRAWINGS

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings in which:

DETAILED DESCRIPTION OF THE DRAWINGS

Figure 1:
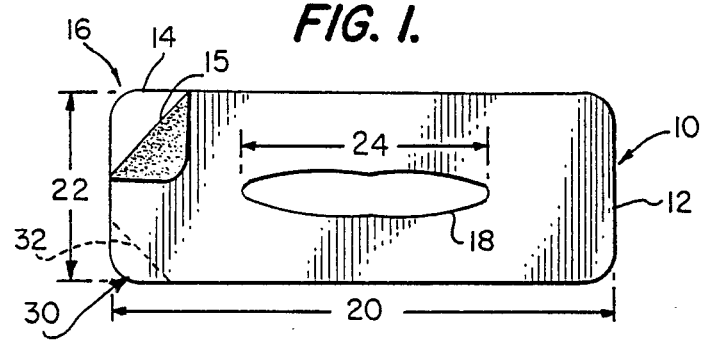
FIG. 1 is a schematic representation of the protective barrier.

The present invention relates to a protective barrier for a CPR doll. FIG. 1 is a schematic illustration of a protective barrier 10 having sheet 12 releasably mounted on backing 14. Corner 16 of barrier 10 is illustrated as being pulled away from backing sheet 14 and reveals surface 15 having adhesive thereon.

Barrier 10 has central opening 18 which is generally an ellipsoid. The shape of central opening 18 is only illustrative and as such can be altered to specifically correspond to the oral opening of an adult CPR doll.

Sheet 12 can be slightly fibrous or clear and can be made of either paper, cloth or plastic. Backing 14 is any convenient backing such that the adhesive on surface 15 is releasable therefrom. Since the CPR dolls are made of a relatively flexible rubber-like plastic, the adhesive should be compatible with the plastic such that sheet 12 can be easily adhered to the lip region of the CPR doll and yet be releasable from the CPR doll. A natural adhesive or a synthetic adhesive may be appropriate depending upon the composition of sheet 12 and backing 14. Further, if adhesive residue remains on the CPR doll after the protective barrier 10 is removed from the doll, the adhesive should be either water soluble or soluble with a mild chemical such that the adhesive can be removed without significantly affecting the CPR doll.

Since the primary purpose of protective barrier 10 is to prevent the spread of germs between individuals learning CPR, protective barrier 10 may preferably be impervious to moisture. Also, sheet 12 can be treated with an antibacterial substance which minimizes bacteria passing therethrough. In this sense, the protective barrier provides a sterile protective barrier for the CPR doll. Further, it can be appreciated that, since the CPR doll's lips stimulate the lips of a human, sheet 12 should be relatively flexible and freely applicable such that the sheet can cover the lips of the CPR doll as well as the surrounding lip region. The size of the protective barrier preferably covers an area between the adult CPR doll's left and right zygomatic areas (see FIG. 2) in a horizontal direction with respect to FIG. 1 and covers from the maxilla to the mid-chin region of the CPR doll in the vertical direction. It is estimated that a protective barrier having width 20 of approximately 11 centimeters and a height 22 of approximately 4 centimeters is appropriate. As for central opening 18, width 24 is estimated to be approximately 5.5 centimeters.

Figure 2:
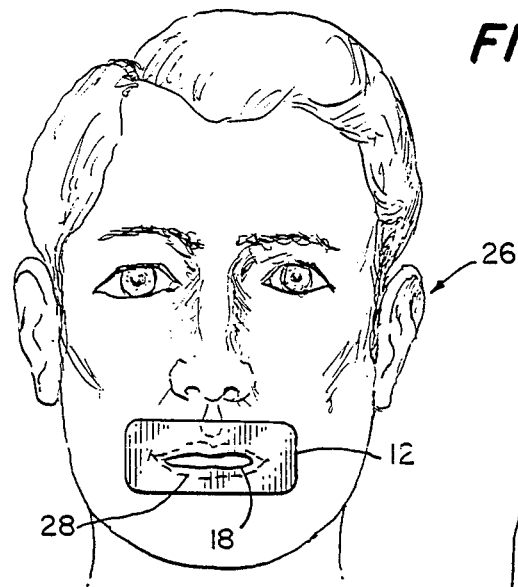
FIG. 2 is a schematic representation of the barrier adhered to the lips of a CPR doll.

FIG. 2 illustrates sheet 12 having central opening 18 in close proximity to the oral opening of CPR doll 26 and clearly illustrates sheet 12 covering lips 28 of that doll.

In order to remove sheet 12 from the CPR doll, the sheet, at corner 30, has a permanently affixed backing tab 32.

Figure 3:
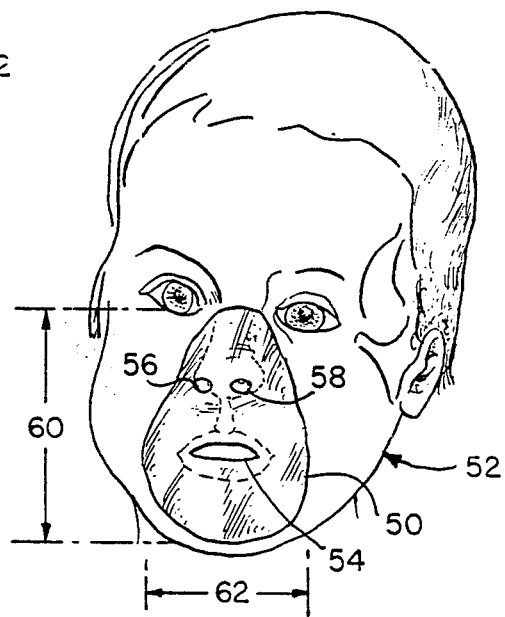
FIG. 3 is the alternate embodiment of the protective barrier adhered to the lip and nasal region of a pediatric CPR doll.

As illustrated in FIG. 3, a protective barrier 50 is affixed to the mouth and nose regions of pediatric CPR doll 52. Sheet 50 is generally pear-shaped and is constructed in a similar fashion to protective barrier 10 illustrated in FIG. 1. Sheet 50 covers an area on the pediatric CPR doll from the nasal bridge extending outward to the right and left cheeks of the doll and has a base slightly narrowing under the doll's chin. Central opening 54 is disposed over the oral opening of CPR doll 52. Additionally, sheet 50 has two apertures 56 and 58 positioned proximate the nasal openings on CPR doll 52. As stated earlier, the person learning CPR places his mouth over the oral opening and the nasal passages of the pediatric CPR doll in order to fill the doll's lungs with air. Hence, protective barrier 50 must extend over a larger portion of the face of CPR doll 52 as compared with barrier 10 for the adult CPR doll. However, with both the adult CPR and the pediatric CPR doll, the lips of the doll are covered by a protective barrier. Approximate measurements of sheet 50 are 7.5 centimeters between the right and left cheeks of the doll (dimension 62) and approximately 5.5 centimeters vertically from the nasal passages of the doll to the chin of the doll (dimension 60). Again, the particular shape of sheet 20 can be altered to match the shape of a pediatric CPR doll.

While only certain preferred features of the invention have been shown by way of illustration, modifications and changes will be apparent to those of ordinary skill in the art. It is understood that the appended claims are intended to cover such modifications and changes as fall within the true spirit and scope of the invention.

I claim:

1. A protective barrier adapted to be adhered onto the lips and lip region proximate thereto defining the oral opening of a CPR doll made of rubber-like plastic the barrier comprising a protective sheet of material substantially impervious to germs and bacteria sized to completely cover the lips and lip region of said CPR doll, said protective sheet having a central opening corresponding to the oral opening of said CPR doll and having an adhesive covering substantially all of one surface thereof; said adhesive being compatible with said rubber-like plastic of said CPR doll, being easily releasable from said CPR doll, and being removable therefrom such that any residue remaining on said CPR doll is easiy removable therefrom; said protective sheet having a permanently affixed backing tab at a peripheral location on said one surface in order to facilitate the removal of said protective sheet from said CPR doll.

2. A protective barrier as claimed in claim 1 wherein said CPR doll is an adult CPR doll, the area of said sheet corresponds to the region between the left and right zygomatic portions of said CPR doll and from the maxilla to the mid-chin portion of the CPR doll and the position of said central opening corresponds to the oral opening of said CPR doll.

3. A protective barrier as claimed in claim 2 wherein said central opening is an ellipsoid.

4. A protective barrier as claimed in claim 3 wherein said adhesive is releasable from said lips of said CPR doll.

5. A protective barrier as claimed in claim 3 wherein said sheet is impervious to moisture.

6. A protective barrier adapted to be adhered onto the lips and adjoining region defining the oral opening of a pediatric CPR doll made of rubber-like plastic, the barrier comprising:

a protective sheet of material substantially impervious to germs and bacteria sized to completely cover the lips and adjoining region of said pediatric CPR doll and further sized cover of the nasal bridge and nostrils of said pediatric CPR doll;

said protective sheet including a central opening corresponding to the oral opening of said pediatric CPR doll and having two apertures adapted to be positioned approximate the nasal openings on said CPR doll;

said protective sheet having an adhesive covering substantially all of one surface thereof, said adhesive being compatible with said rubber-like plastic of said pediatric CPR doll, being easily releasable from said pediatric CPR doll, and being removable therefrom such that any residue remaining on said pediatric CPR doll is easily removable therefrom; and, said protective sheet having a permanently affixed backing tab at a peripheral location on said one surface in order to facilitate the removal of said protective sheet from said pediatric CPR doll.

7. A protective barrier as claimed in claim 6 wherein said protective sheet is additionally sized to extend to the left and right cheeks of said pediatric CPR doll.

* * * * *